United States Patent
Pereira et al.

(10) Patent No.: US 9,806,860 B2
(45) Date of Patent: Oct. 31, 2017

(54) MECHANISMS FOR SINGLE USER (SU) AND MULTIPLE USER (MU) TRANSMISSION AND ASSOCIATION VIA POLLING WITHIN WIRELESS COMMUNICATIONS

(71) Applicant: BROADCOM CORPORATION, Irvine, CA (US)

(72) Inventors: Stephanie Felicia Pereira, San Jose, CA (US); Matthew James Fischer, Mountain View, CA (US); Ron Porat, San Diego, CA (US); Nihar Jindal, Mountain View, CA (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 122 days.

(21) Appl. No.: 14/838,452

(22) Filed: Aug. 28, 2015

(65) Prior Publication Data
US 2016/0066318 A1    Mar. 3, 2016

Related U.S. Application Data

(60) Provisional application No. 62/043,223, filed on Aug. 28, 2014, provisional application No. 62/150,810, (Continued)

(51) Int. Cl.
*H04W 4/00* (2009.01)
*H04L 5/00* (2006.01)
(Continued)

(52) U.S. Cl.
CPC ........... *H04L 5/0007* (2013.01); *H04W 74/06* (2013.01); *H04L 5/0044* (2013.01); *H04L 5/0055* (2013.01); *H04W 74/006* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2012/0147843 A1* | 6/2012 | Pison | H04L 5/0044 370/330 |
| 2013/0286959 A1* | 10/2013 | Lou | H04W 72/04 370/329 |

* cited by examiner

*Primary Examiner* — Gerald Smarth
(74) *Attorney, Agent, or Firm* — Garlick & Markison; Shayne X. Short

(57) ABSTRACT

A wireless communication device (alternatively, device) includes a processor configured to support communications with other wireless communication device(s) and to generate and process signals for such communications. In some examples, the device includes a communication interface and a processor, among other possible circuitries, components, elements, etc. to support communications with other device(s) and to generate and process signals for such communications. A device generates and transmits a resource and association poll frame (ra-poll frame) to other device(s). The contents of ra-poll frame direct which of the other device(s) is authorized to respond to the device (e.g., authorized device(s)) and the manner in which they are authorized to respond. Authorized device(s) transmit responses that may include association request(s) and/or a resource request(s), among other types of communications. The device then generates and transmits acknowledgement(s) (ACK(s)) indicates successful receipt of any responses from the authorized device(s).

20 Claims, 9 Drawing Sheets

Related U.S. Application Data filed on Apr. 21, 2015, provisional application No. 62/198,467, filed on Jul. 29, 2015.

(51) Int. Cl.
*H04W 74/06* (2009.01)
*H04W 88/08* (2009.01)
*H04W 74/00* (2009.01)

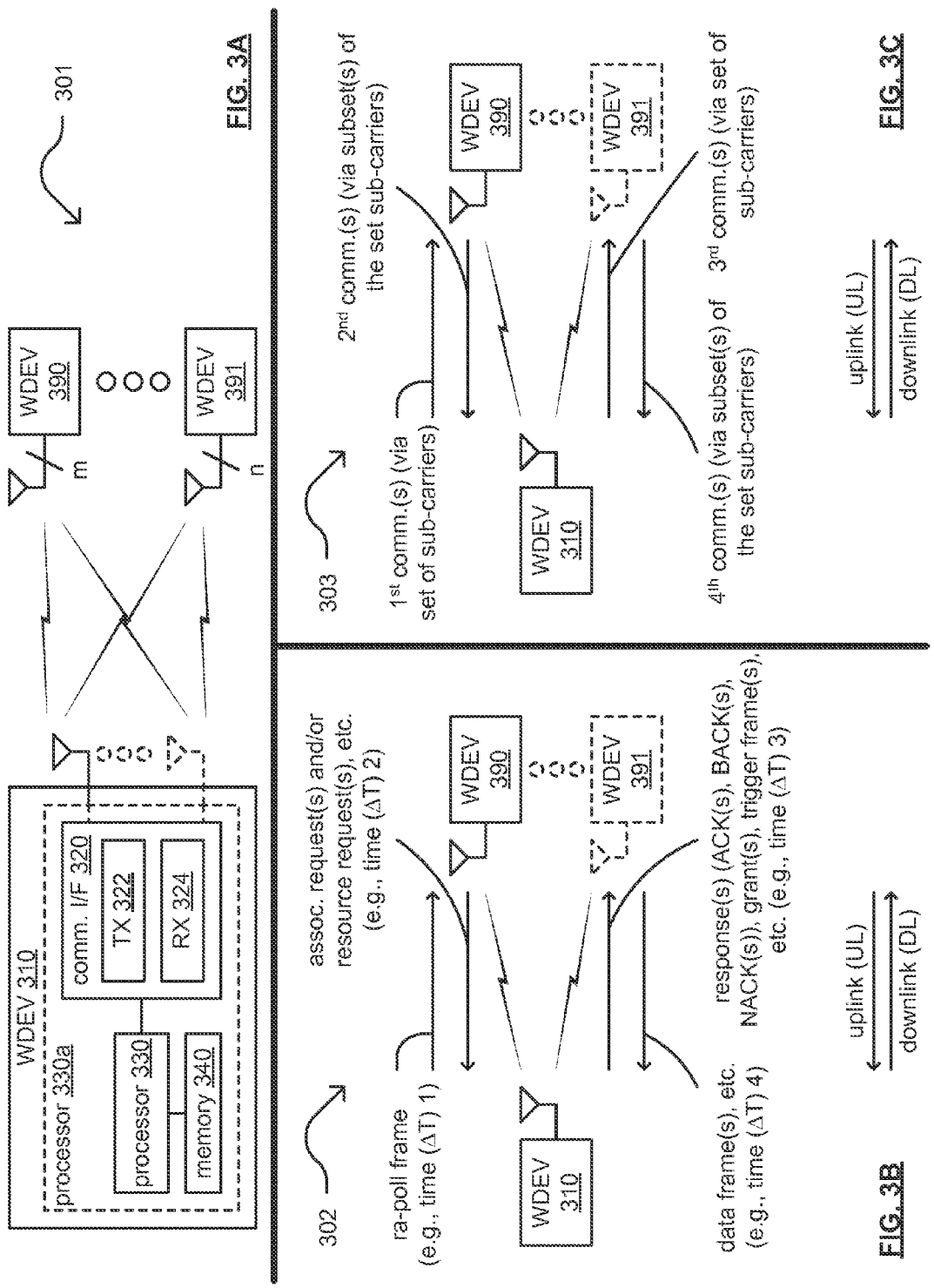

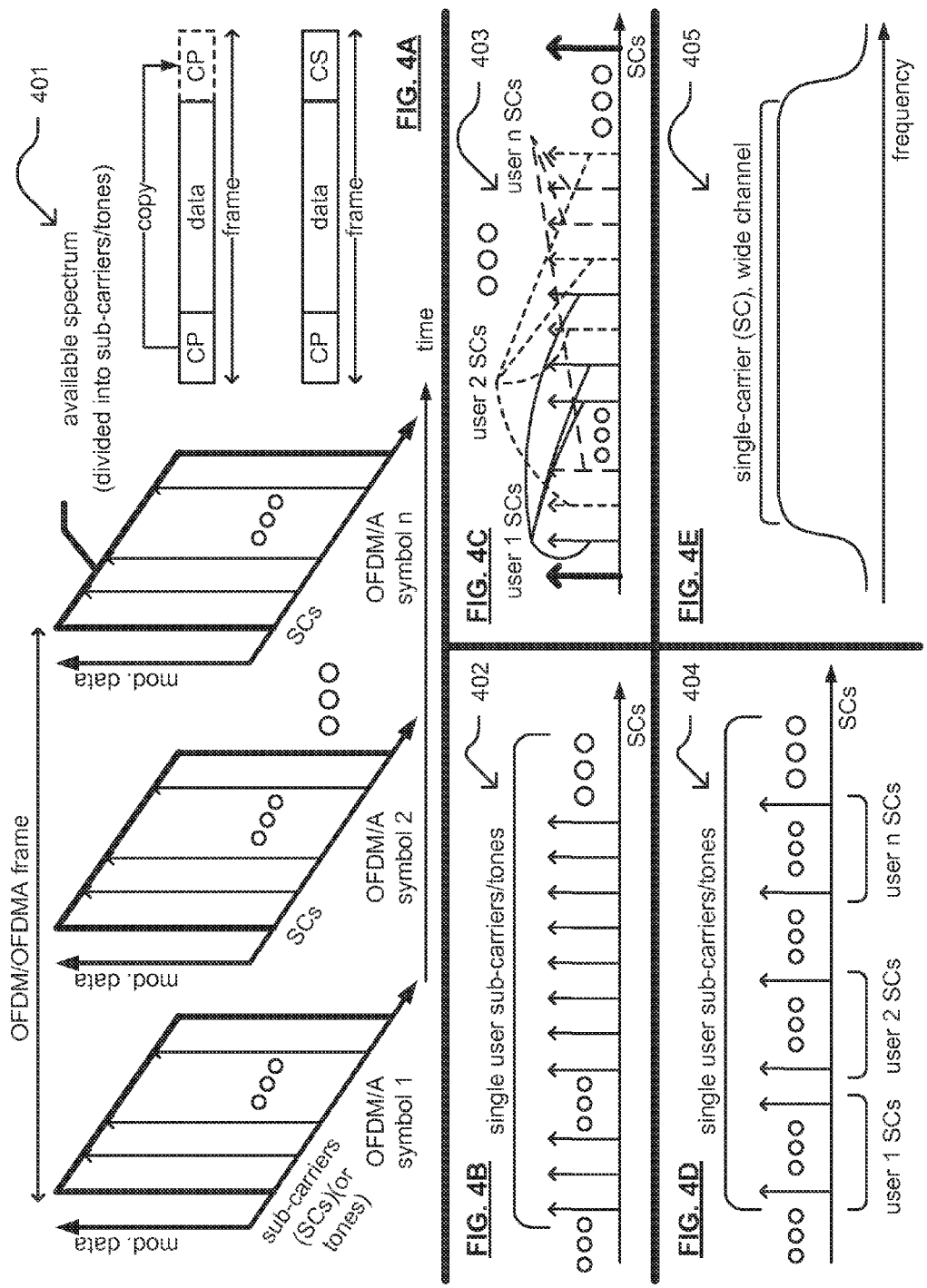

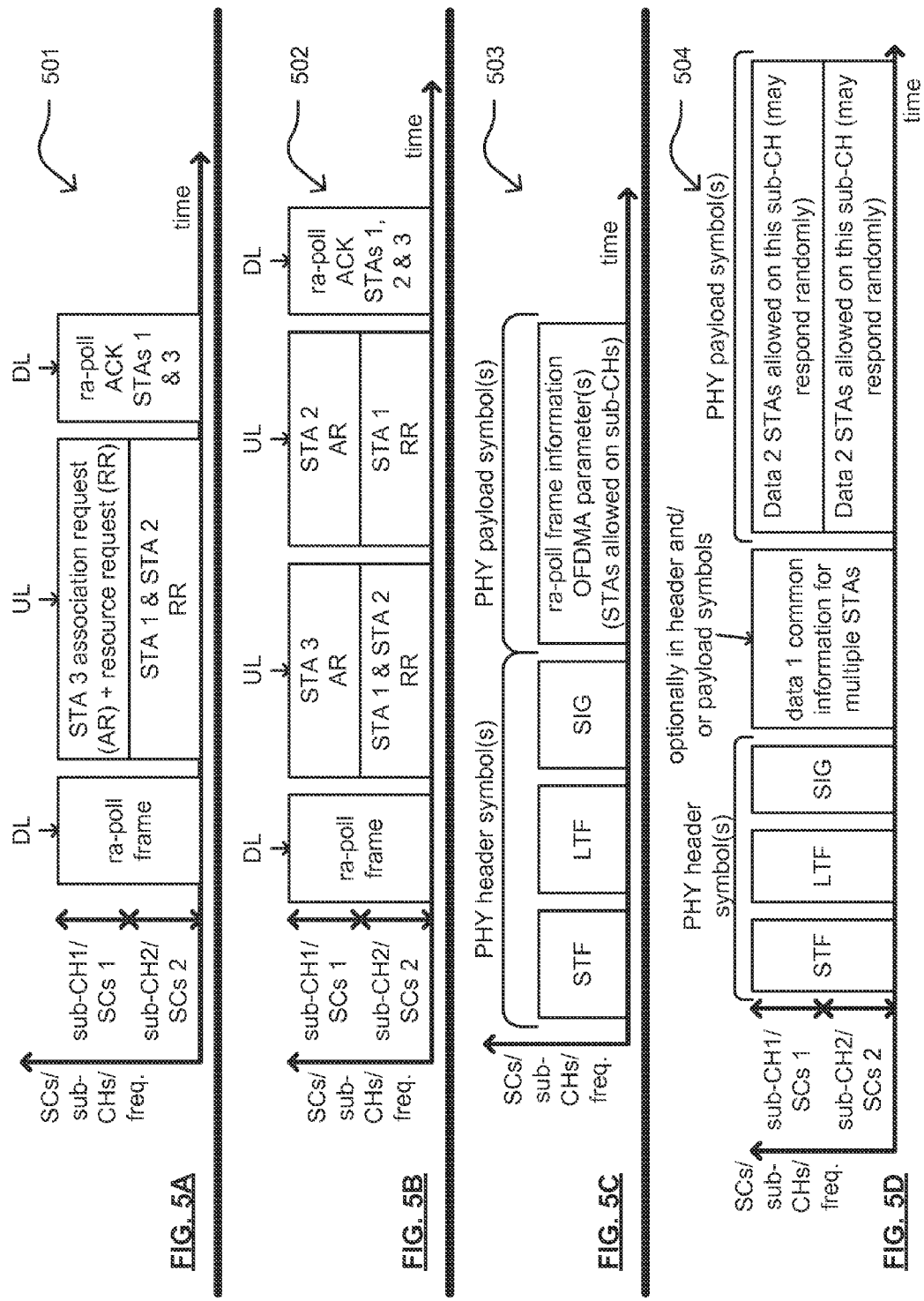

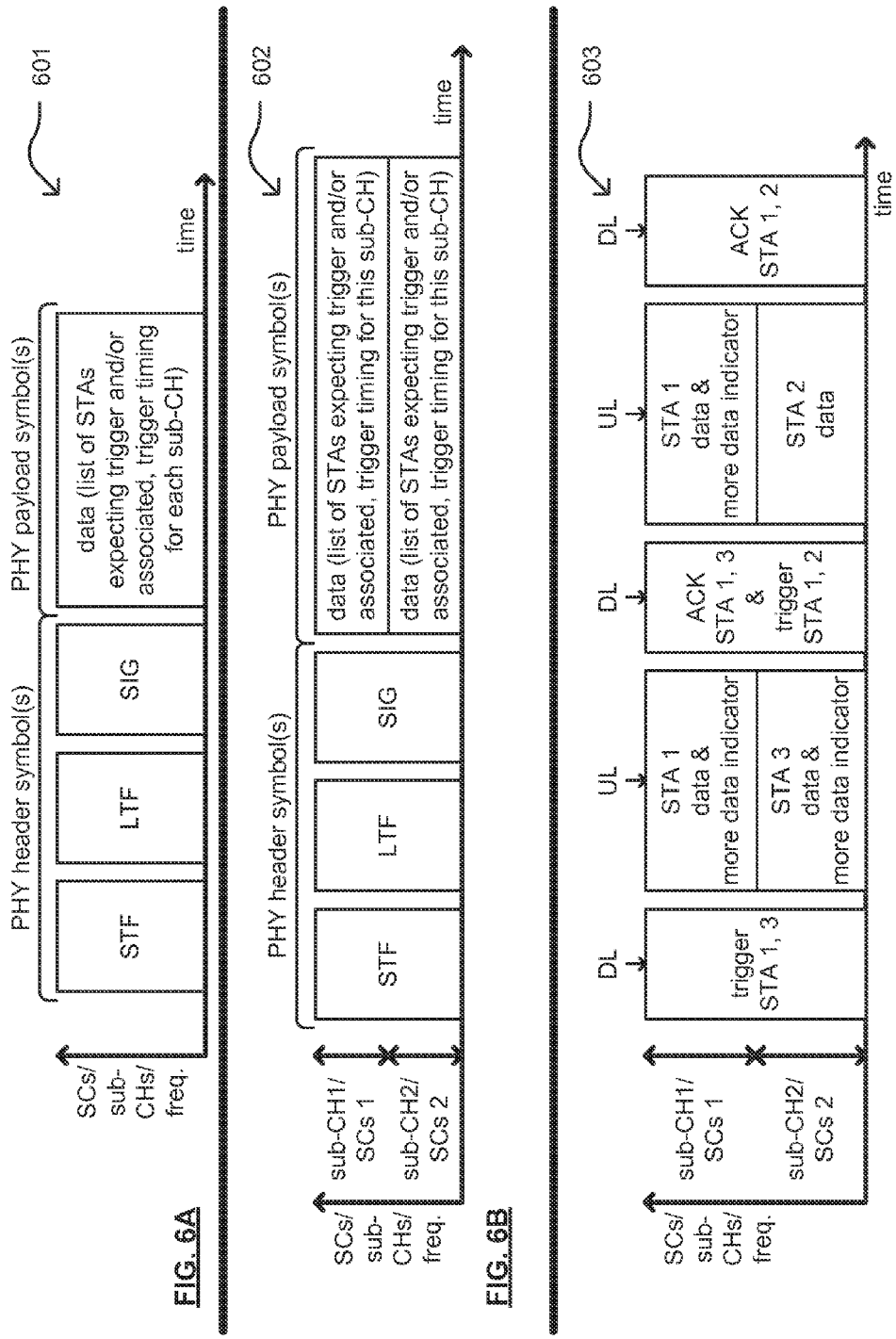

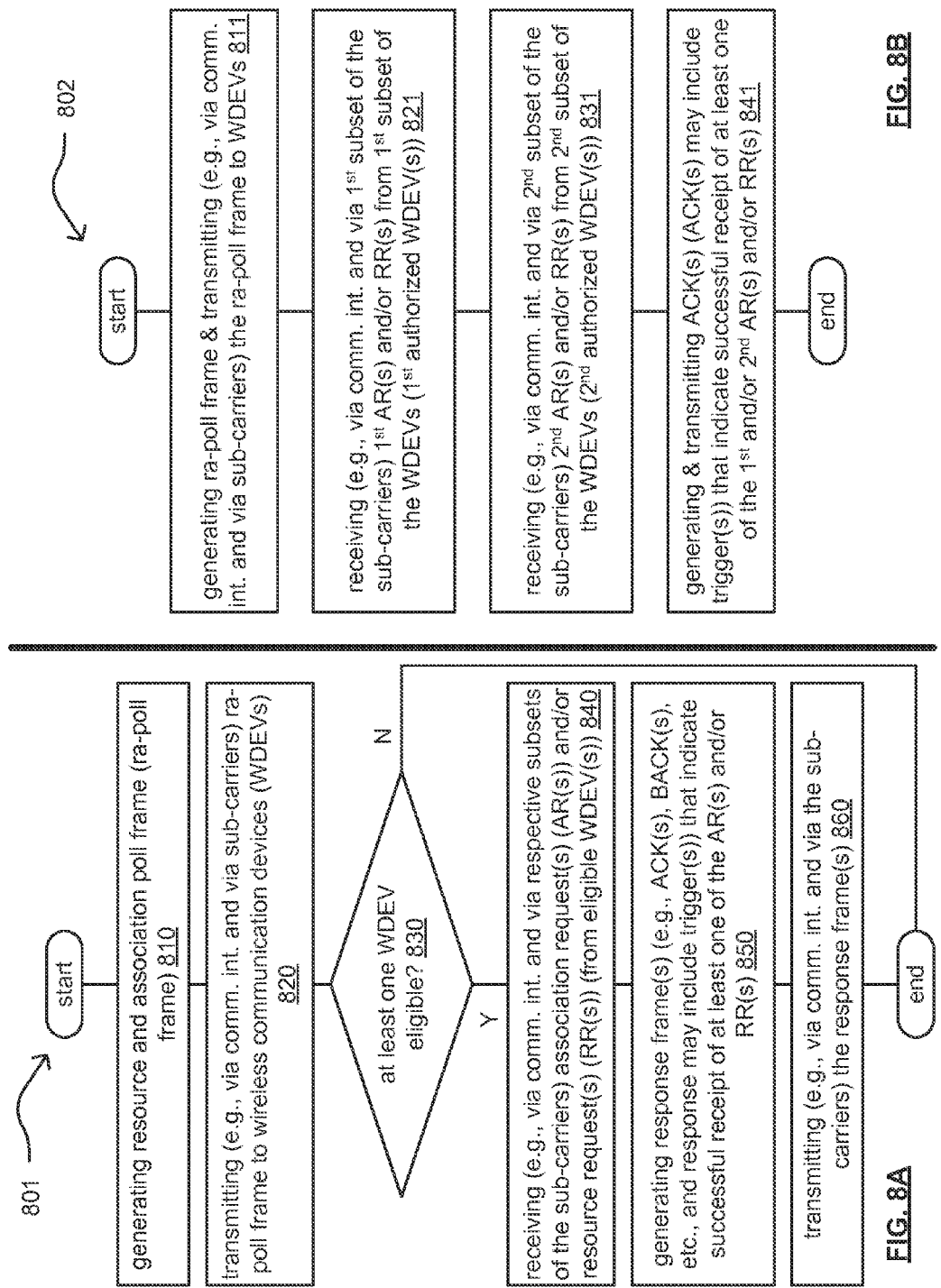

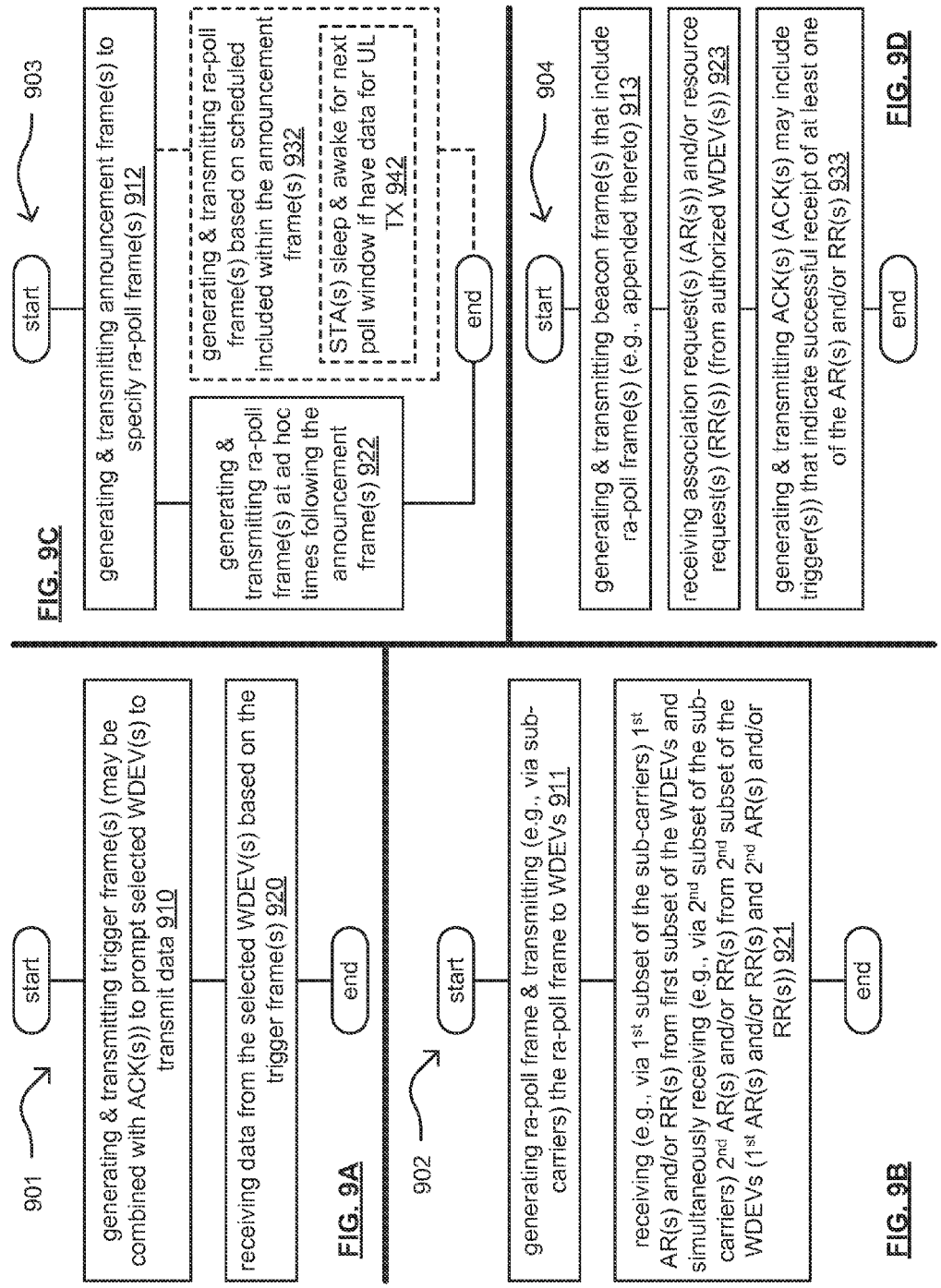

MECHANISMS FOR SINGLE USER (SU) AND MULTIPLE USER (MU) TRANSMISSION AND ASSOCIATION VIA POLLING WITHIN WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to U.S. Provisional App. Ser. No. 62/043,223, entitled "Mechanisms for single user (SU) and multiple user (MU) transmission and association via polling within wireless communications," filed Aug. 28, 2014; U.S. Provisional App. Ser. No. 62/150,810, entitled "Mechanisms for single user (SU) and multiple user (MU) transmission and association via polling within wireless communications," filed Apr. 21, 2015; and U.S. Provisional App. Ser. No. 62/198,467, entitled "Mechanisms for single user (SU) and multiple user (MU) transmission and association via polling within wireless communications," filed Jul. 29, 2015, all of which are hereby incorporated herein by reference in their entirety and made part of the present U.S. Utility patent application for all purposes.

BACKGROUND

Technical Field

The present disclosure relates generally to communication systems; and, more particularly, to communications including polling within single user, multiple user, multiple access, and/or MIMO wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

The number of operating wireless communication devices within various communication systems continues to grow. The prior art does not provide adequate means to operate such communications in such communication systems effectively.

BRIEF DESCRIPTION OF THE SEVERAL VIEWS OF THE DRAWINGS

FIG. 3A is a diagram illustrating an example of communication between wireless communication devices.

FIG. 3B is a diagram illustrating another example of communication between wireless communication devices.

FIG. 3C is a diagram illustrating another example of communication between wireless communication devices.

FIG. 4A is a diagram illustrating an example of orthogonal frequency division multiplexing (OFDM) and/or orthogonal frequency division multiple access (OFDMA).

FIG. 4B is a diagram illustrating another example of OFDM and/or OFDMA.

FIG. 4C is a diagram illustrating another example of OFDM and/or OFDMA.

FIG. 4D is a diagram illustrating another example of OFDM and/or OFDMA.

FIG. 4E is a diagram illustrating an example of single-carrier (SC) signaling.

FIG. 5A is a diagram illustrating an example of a poll window.

FIG. 5B is a diagram illustrating another example of a poll window.

FIG. 5C is a diagram illustrating an example of an ra-poll frame that specifies which devices may respond and in what manner.

FIG. 5D is a diagram illustrating another example of an ra-poll frame.

FIG. 6A is a diagram illustrating an example of an ra-poll acknowledgement (ACK) frame.

FIG. 6B is a diagram illustrating another example of an ra-poll ACK frame.

FIG. 6C is a diagram illustrating an example of a trigger period.

FIG. 8A is a diagram illustrating an embodiment of a method for execution by one or more wireless communication devices.

FIG. 8B is a diagram illustrating another embodiment of a method for execution by one or more wireless communication devices.

FIG. 9A is a diagram illustrating another embodiment of a method for execution by one or more wireless communication devices.

FIG. 9B is a diagram illustrating another embodiment of a method for execution by one or more wireless communication devices.

FIG. 9C is a diagram illustrating another embodiment of a method for execution by one or more wireless communication devices.

FIG. 9D is a diagram illustrating another embodiment of a method for execution by one or more wireless communication devices.

DETAILED DESCRIPTION

Figure 1:
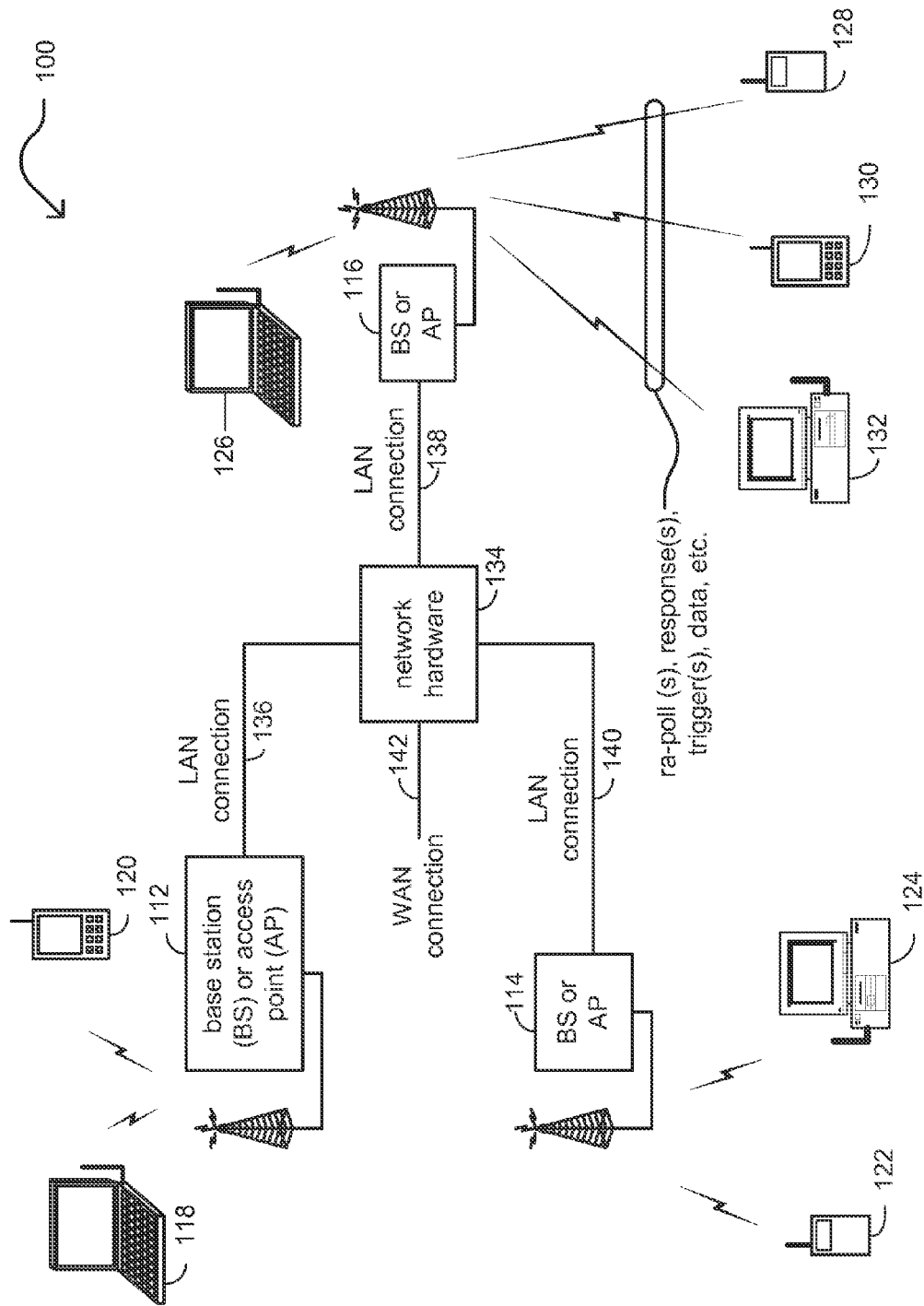
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The details of an embodiment of such wireless communication devices are described in greater detail with reference to FIG. 3A among other diagrams.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and/or a communication interface to support communications with any other of the wireless communication devices 118-132 and BSs or APs 112-116. In an example of operation, a processor and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210," or "devices 210-234" when referring to "wireless communication devices 210-234"; or with respect to FIG. 3 below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processor and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processor (and possibly other possible circuitries, components, elements, etc.) to support communications with other device(s) and to generate and process signals for such communications. The communication interface and/or the processor operate to perform various operations and functions to effectuate such communications.

In an example of operation, the BS or AP 116 generates a resource and association poll frame (ra-poll frame) and transmits the ra-poll frame to the WDEVs 128-132. In some examples, the ra-poll frame specifies parameters for use by the WDEVs 128-132 to determine their respective eligibility to transmit to the wireless communication device. The ra-poll frame may also specify one or more subsets of sub-carriers for use by the WDEVs 128-132 to transmit to the BS or AP 116. The ra-poll frame may also specify one or more timeslots for use by the WDEVs 128-132 to transmit to the BS or AP 116. The ra-poll frame may also specify at least one authorized frame format for use by the WDEVs 128-132. The BS or AP 116 then transmits the ra-poll frame to the plurality of other wireless communication devices via the sub-carriers (e.g., via all of the sub-carriers that span the subsets of sub-carriers). When at least one wireless communication device of the WDEVs 128-132 determines eligibility to transmit to the BS or AP 116 based on the plurality of parameters, the BS or AP 116 receives at least one of association request and/or resource request that complies with the at least one authorized frame format from the at least one wireless communication device. The BS or AP 116 then generate a response frame that indicates successful receipt of the association request and/or the resource request, and transmits the response frame to the at least one wireless communication device via the plurality of sub-carriers.

In another example of operation, when the BS or AP 116 fails to receive any association request or resource request after a period of time (e.g., a period of time such as X seconds, where X is any desired value including any value less than or greater than 1 second), the BS or AP 116 generates and transmits another ra-poll frame to the WDEVs 128-132. This other ra-poll frame includes other parameters (wherein at least one parameter is different than the parameters in the prior ra-poll frame) for use by the WDEVs 128-132 to determine eligibility to transmit to the BS or AP 116.

In general, the ra-poll frame includes parameters that get processed by the WDEVs 128-132 so that the WDEVs 128-132 can determine whether or not they are eligible to respond or transmit to the BS or AP 116 and if eligible, then when they can respond or transmit. Note that any of a number of parameters may be used and processed by the WDEVs 128-132 to determine eligibility (e.g., based on one or more of timeslots, subsets of sub-carriers, sub-channel assignment, type of resource request, and/or any other desired types of parameters, criteria, etc.).

In another example of operation, the BS or AP 116 generates a resource and association poll frame (ra-poll frame) and transmits the ra-poll frame to the WDEVs 128-132 such that the ra-poll frame specifies a subset of authorized wireless communication devices (e.g., specifies all of the WDEVs 128-132, one or more subsets of WDEVs of the WDEVs 128-132) that are authorized to transmit to the BS or AP 116. If desired, this can be achieved by setting the parameters in the ra-poll frame so that, when they are processed by the WDEVs 128-132, are essentially guaranteed to ensure that the subset of authorized wireless communication devices do in fact determine their eligibility to transmit to the BS or AP 116. In other examples, the ra-poll frame specifies one or more subsets of sub-carriers of a group of sub-carriers for use by the subset of authorized wireless communication devices to transmit to the BS or AP 116. In other examples, the ra-poll frame specifies one or more authorized frame formats for use by the subset of authorized wireless communication devices to transmit to the BS or AP 116. In some example, the BS or AP 116 transmits, via the group of sub-carriers, the ra-poll frame to the WDEVs 128-132. The BS or AP 116 transmits receives, via at least one subset of sub-carriers and from at least one wireless communication device of the subset of authorized wireless communication devices, an association request and/or a resource request that complies with the at least one authorized frame format. The BS or AP 116 then generates an a response frame (e.g., an acknowledgement (ACK) frame that includes an ACK, a block acknowledgement (BACK) frame that includes more than one ACK, and/or other type of response frame) that indicates successful receipt of the association request and/or the resource request, and the BS or AP 116 then transmits, via the group of sub-carriers, the response frame to the at least one wireless communication device of the subset of authorized wireless communication devices.

Among other considerations, the exchange of communications between the BS or AP 116 and at least one of the WDEVs 128-132 that include a ra-poll frame, one or more association requests and/or a resource requests, one or more response frames (e.g., ACKs, BACKs, etc.), etc. provides novel mechanism for a wireless communication device (e.g., wireless station (STA), wherein such a wireless communication device may generally be referred to as a STA herein, or an access point (AP), wherein such a wireless communication device may generally be referred to as a AP herein) that receives data from one or more other STAs (and/or access point (AP)) over the same time and/or frequency and/or spatial and or/code domains. These novel solutions address coordination regarding the STA knowing which of the other STAs have data and also scheduling for communications of the STAs efficiently.

This disclosure also presents novel solutions for allowing a STA to associate to an AP at the same time as other STAs transmit resource or association requests to the same AP. This disclosure presents novel solutions for a polling mechanism to enable a STA to query other STAs as to whether they have traffic to transmit and/or to query extra-basic services set (BSS) STAs as to whether they would like to transmit an association request. The polling STA sets conditions to establish the subset of STAs that may respond and in what manner they may respond.

Figure 2:
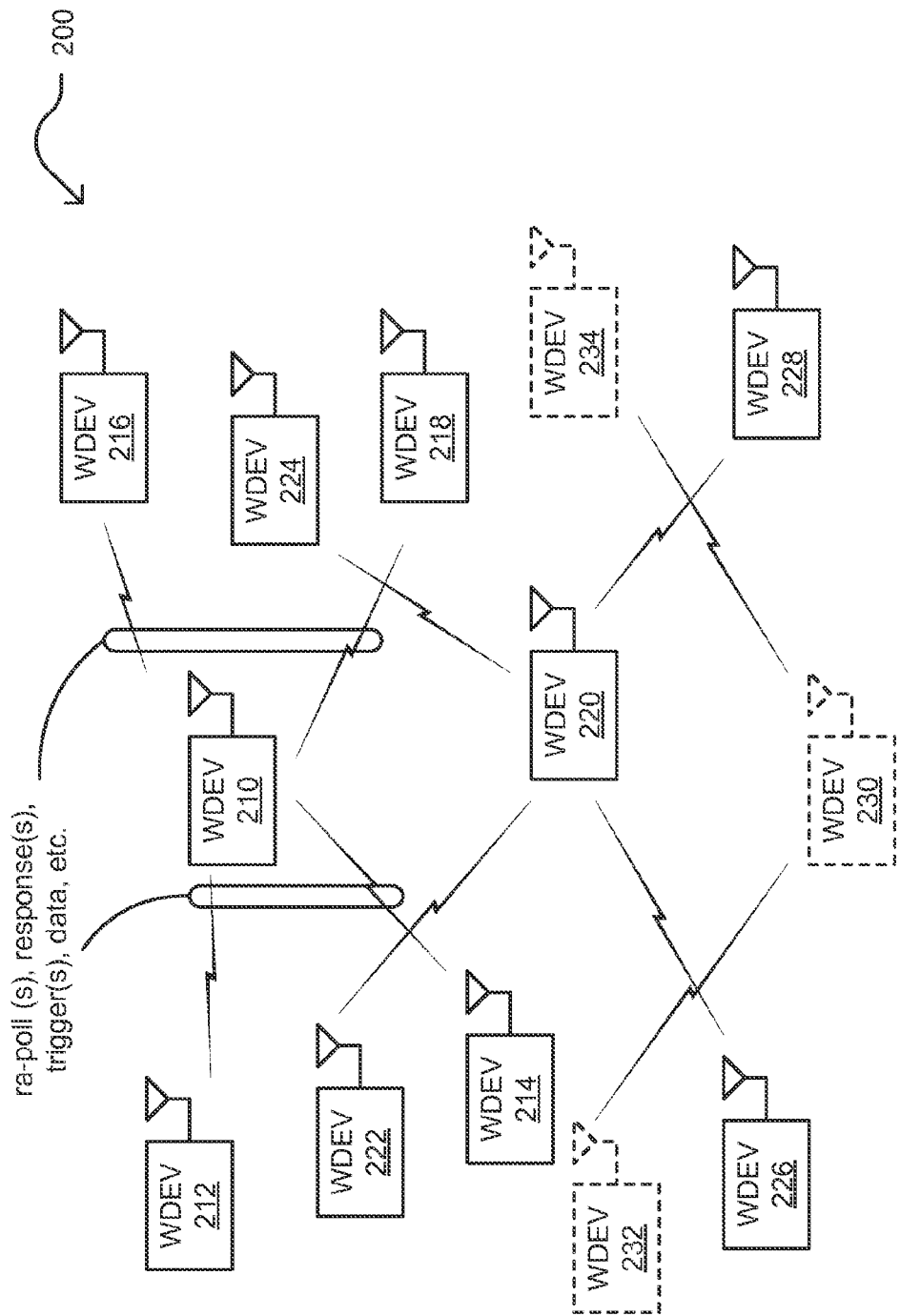
FIG. 2 is a diagram illustrating an embodiment of dense deployment of wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of operation, the WDEV 210 generates a resource and association poll frame (ra-poll frame) and transmits the ra-poll frame to the WDEVs 212, 216, 222, and 224. In some examples, the ra-poll frame specifies parameters for use by the WDEVs 212, 216, 222, and 224 to determine their respective eligibility to transmit to the wireless communication device. The ra-poll frame may also specify one or more subsets of sub-carriers for use by the WDEVs 212, 216, 222, and 224 to transmit to the WDEV 210. The ra-poll frame may also specify one or more timeslots for use by the WDEVs 212, 216, 222, and 224 to transmit to the WDEV 210. The ra-poll frame may also specify at least one authorized frame format for use by the WDEVs 212, 216, 222, and 224. The WDEV 210 then transmits the ra-poll frame to the plurality of other wireless communication devices via the sub-carriers (e.g., via all of the sub-carriers that span the subsets of sub-carriers). When at least one wireless communication device of the WDEVs 212, 216, 222, and 224 determines eligibility to transmit to the WDEV 210 based on the plurality of parameters, the WDEV 210 receives at least one of association request and/or resource request that complies with the at least one authorized frame format from the at least one wireless communication device. The WDEV 210 then generate a response frame that indicates successful receipt of the association request and/or the resource request, and transmits the response frame to the at least one wireless communication device via the plurality of sub-carriers.

In another example of operation, the WDEV 210 generates a resource and association poll frame (ra-poll frame) and transmits the ra-poll frame to the WDEVs 212, 216, 222, and 224. In some examples, the ra-poll frame specifies a subset of authorized wireless communication devices (e.g., specifies all of the WDEVs 212, 216, 222, and 224, one or more subsets of WDEVs of the WDEVs 212, 216, 222, and 224) that are authorized to transmit to the WDEV 210. In other examples, the ra-poll frame specifies one or more subsets of sub-carriers of a group of sub-carriers for use by the subset of authorized wireless communication devices to transmit to the WDEV 210. In other examples, the ra-poll frame specifies one or more authorized frame formats for use by the subset of authorized wireless communication devices to transmit to the WDEV 210. In some example, the WDEV 210 transmits, via the group of sub-carriers, the ra-poll frame to the WDEVs 212, 216, 222, and 224. The WDEV 210 transmits receives, via at least one subset of sub-carriers and from at least one wireless communication device of the subset of authorized wireless communication devices, an association request and/or a resource request that complies with the at least one authorized frame format. The WDEV 210 then generates a response frame (e.g., ACK, BACK, and/or other type of response frame) that indicates successful receipt of the association request and/or the resource request, and the WDEV 210 then transmits, via the group of sub-carriers, the response frame to the at least one wireless communication device of the subset of authorized wireless communication devices.

In another example of operation, the WDEV 210 receives one or more resource requests from at least one WDEV of the WDEVs 212, 216, 222, and 224 that are included within a subset of authorized WDEVs. The WDEV 210 then processes the one or more resource requests to identify at least one type of resource requested by the at least one WDEV and generates a grant frame that includes at least one grant of the at least one type of resource to the at least one WDEV. The WDEV 210 then transmits the grant frame to the at least one WDEV and receives at least one data frame from the at least one WDEV such that the at least one data frame is based on the at least one grant of the at least one type of resource. Note that grant frame may also include information for use by the WDEVs 212, 216, 222, and/or 224 at or during some future time. For example, a grant frame may also include information related to a resource allocation that is coming sometime later in the future. Also, in some examples, one of the WDEVs 212, 216, 222, and/or 224 may awaken from a reduced and/or low power state, and then if a trigger is detected, then the one of the WDEVs 212, 216, 222, and/or 224 transmits based on the trigger using information included within at least one prior grant frame.

In another example of operation, the WDEV 210 generates the ra-poll frame that also specifies WDEV 212 and a WDEV 214 as being authorized to transmit to the WDEV 210, a first subset of sub-carriers of a plurality of sub-carriers for use by the WDEV 212 to transmit to the WDEV 210, and a second subset of sub-carriers of the plurality of sub-carriers for use by the WDEV 214 to transmit to the WDEV 210. The WDEV 212 then receives, via the first subset of sub-carriers and from the WDEV 212, the association request and/or the resource request that complies with the at least one authorized frame format and receives, via the second subset of sub-carriers and from the WDEV 213, another association request and/or another resource request that complies with the at least one authorized frame format. In some examples, the WDEV 210 is configured to receive simultaneously the association request and/or the resource request and the other association request and/or the other resource request (e.g., such as via an orthogonal frequency division multiple access (OFDMA) communication). Note that the association request and/or the resource request and the other association request and/or another resource request have a communication length or duration.

Examples of certain terminology used herein are described below. Uplink (UL) refers to any transmission from a polled device (e.g., STA, AP, etc.) in response to a trigger from a polling device (e.g., STA, AP, etc.). Downlink (DL) refers to any transmission from a (e.g., STA, AP, etc.) to a polled device (e.g., STA, AP, etc.). A multiuser (MU) frame may contain data from/to one or more STAs. Example technologies for a MU UL frame are uplink OFDMA, uplink multi-user multiple-input-multiple-output (MU-MIMO). Association request as used herein includes either association request or reassociation request. (Re)association request as used herein includes either association request or reassociation request.

With respect to various communications described herein, note that an associating device (e.g., STA, AP, etc.) may piggyback a resource request to its association request frame. A device (e.g., STA, AP, etc.) may piggyback resource requests to send more data to any of its UL data frames. A device (e.g., STA, AP, etc.) may send trigger frame to prompt specific devices (e.g., STAs, APs, etc.) to send MU UL frames. A device (e.g., STA, AP, etc.) may piggyback trigger to its acknowledgement (ACK) frames.

Some examples of operation of such a novel channel access protocol may be viewed may be viewed as including 3 stages: Poll window, Trigger Period, and non-trigger-based access time (e.g. enhanced distributed channel access (EDCA), HFC (hybrid coordination function) controlled channel access (HCCA), or distributed coordination function (DCF) time period). During the poll window, a device (e.g., STA, AP, etc.) transmits resource and association poll frame (ra-poll frame) (e.g., a frame that specifies which devices may respond and in what manner). A ra-poll frame specifies which other devices may respond and in what manner. Devices decode poll and determine whether they are allowed to respond. If the device has data and is allowed to respond, a device sends a resource request using a required format from among a number of possible frame formats. If the device would like to join the BSS and is allowed to respond, a device sends an association request using the required format. Polling device transmits frame(s) to acknowledge devices whose resource requests or association requests are received successfully. The polling device may choose to acknowledge only those devices that are scheduled to make a transmission in a subsequent trigger period.

During the trigger period, a polling device sends trigger to prompt devices to send data frames. A responding device sends MU UL data frames using specified format, e.g. UL MU OFDMA, UL MU MIMO, SU. Polling device acknowledges data and may append trigger for next trigger period.

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of at least one packet or frame (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes a processor 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennae, and WDEV 391 may include n antennae).

Also, in some examples, note that one or more of the processor 330, the communication interface 320 (including the TX 322 and/or RX 324 thereof), and/or the memory 340 may be implemented in one or more "processing modules," "processing circuits," "processors," and/or "processing units". Considering one example, one processor 330a may be implemented to include the processor 330, the communication interface 320 (including the TX 322 and/or RX 324 thereof), and the memory 340. Considering another example, two or more processors may be implemented to include the processor 330, the communication interface 320 (including the TX 322 and/or RX 324 thereof), and the memory 340. In such examples, such a "processor" or "processors" is/are configured to perform various operations, functions, communications, etc. as described herein.

In general, the various elements, components, etc. shown within the device 310 may be implemented in any number of "processing modules," "processing circuits," "processors," and/or "processing units" (e.g., 1, 2, . . . . and generally using N such "processing modules," "processing circuits," "processors," and/or "processing units", where N is a positive integer greater than or equal to 1).

In some examples, the device 310 includes both processor 330 and communication interface 320 configured to perform various operations. In other examples, the device 310 includes processor 330a configured to perform various operations.

FIG. 3B is a diagram illustrating another example 302 of communication between wireless communication devices. In an example of operation, the device 310 generates a resource and association poll frame (ra-poll frame). The device 310 then transmits the ra-poll frame to other device(s) (e.g., device 390 and/or device 391, among other devices) at or during a first time or time period ($\Delta T$) 1. Then, the device 310 receives association request(s) (AR(s)) and/or resource request(s) (RR(s)) from at least one of the other device(s) at or during a second time or time period ($\Delta T$) 2. The device 310 then generates at least one response frame (e.g., that includes at least one acknowledgement (ACK), negative acknowledgement (NACK), a block acknowledgement (BACK), a grant, and/or trigger, and/or other type of response frame, etc.). For example, such a response frame includes information to indicate successful receipt of the AR(s) and/or RR(s). The device 310 then transmits the response frame at or during a third time or time period ($\Delta T$) 3. Then, the device 310 receives at least one data frame at or during a fourth time or time period ($\Delta T$) 4.

In another example of operation, the device 310 generates a ra-poll frame that specifies a subset of authorized devices within a group of other devices (e.g., device 390 through device 391). The subset of authorized devices is authorized to transmit to the device 310. The ra-poll frame can also include indication of at least one subset of sub-carriers of a group or set of sub-carriers for use by the subset of authorized devices when transmitting to the device 310. Also, the ra-poll frame can also include indication of at least one authorized frame format for use by the subset of authorized devices to transmit to the device. The device 310 then transmits, via the group or set of sub-carriers, the ra-poll frame to the plurality of other wireless communication devices. The device 310 then receives, via the at least one subset of sub-carriers and from at least one wireless communication device of the subset of authorized devices indicated within the ra-poll frame, AR(s) and/or RR(s) that comply with the at least one authorized frame format indicated within the ra-poll frame. The device 310 then generates a response frame (e.g., an acknowledgement (ACK) frame that includes an ACK, a block acknowledgement (BACK) frame that includes more than one ACK, and/or other type of response frame) that indicates successful receipt of the AR(s) and/or RR(s) from at least some of the devices within the subset of authorized devices. The device 310 then transmits, via the plurality of sub-carriers, the response frame to at least one wireless communication device of the subset of authorized wireless communication devices from which AR(s) and/or RR(s) have been received.

FIG. 3C is a diagram illustrating another example 303 of communication between wireless communication devices. The communication interface 320 of WDEV 310 is configured to receive a first signal from a first other device (e.g., WDEV 390). In an example of operation, the device 310 transmits first communication(s) to at least one device of the device 390 through device 391 via a group or set of sub-carriers at or during a first time or time period (ΔT) 1. Then, the device 310 receives second communication(s) from the at least one device of the device 390 through device 391 via at least one subset of sub-carriers of the group or set of sub-carriers at or during a second time or time period (ΔT) 2.

Then, the device 310 transmits third communication(s) to at least one device of the device 390 through device 391 via the group or set of sub-carriers at or during a third time or time period (ΔT) 3. Then, the device 310 receives fourth communication(s) from the at least one device of the device 390 through device 391 via at least one subset of sub-carriers of the group or set of sub-carriers at or during a fourth time or time period (ΔT) 4.

In another example of operation, the device 310 transmits an ra-poll frame to at least one device of the device 390 through device 391 via a group or set of sub-carriers at or during a first time or time period (ΔT) 1. Then, the device 310 receives AR(s) and/or RR(s) from at least one device of the device 390 through device 391 that is specified within the ra-poll frame via at least one subset of sub-carriers of the group or set of sub-carriers that is also specified within the ra-poll frame at or during a second time or time period (ΔT) 2.

Then, the device 310 transmits at least one response frame (e.g., that includes at least one ACK, NACK, BACK, grant, and/or trigger, and/or any other type of response frame, etc.) to at least one device of the device 390 through device 391 via the group or set of sub-carriers at or during a third time or time period (ΔT) 3. Then, the device 310 receives at least one data frame from the at least one device of the device 390 through device 391 via at least one subset of sub-carriers of the group or set of sub-carriers at or during a fourth time or time period (ΔT) 4.

Some other possible examples of communications between wireless communication devices are described below. In another example of operation, the device 310 receives, from an authorized device (e.g., device 390), at least one RR. The device 310 then processes the at least one RR to identify at least one type of resource requested by the device 390. The device 310 then generates a grant frame that includes at least one grant of the at least one type of resource to the 390. The device 310 then transmits the grant frame to the device 390, and then receives at least one data frame from the device 390. This at least one data frame is based on the at least one grant of the at least one type of resource specifies in the grant frame.

In another example of operation, the device 310 generates a ra-poll frame that also specifies a first authorized device 390 and a second authorized device 391 of a set or group of devices that are authorized to transmit to the device 310, a first subset of sub-carriers of a group or set of sub-carriers for use by the first authorized device 390 to transmit to the device 310, and a second subset of sub-carriers of the group or set of sub-carriers for use by the second authorized device 391 to transmit to the device 310. The device 310 then receives, via the first subset of sub-carriers and from the first authorized device 390, the association request and/or the resource request that complies with the at least one authorized frame format and also receives, via the second subset of sub-carriers and from the second authorized device 391, another association request and/or another resource request that complies with the at least one authorized frame format.

In another example of operation, the device 310 simultaneously receives the association request and/or the resource request and the other association request and/or the other resource request. In some examples, the association request and/or the resource request and the other association request and/or another resource request have a communication length or duration.

In another example of operation, the device 310 generates the ra-poll frame that also specifies at least one authorized traffic type of a plurality of traffic types. The device 310 then receives an association request and/or a resource request from at least one device of the subset of authorized devices when the at least one device of the subset of authorized devices includes the traffic of the at least one authorized traffic type.

In another example of operation, the device 310 generates a trigger frame that prompts at least one of a first other device 390 or a second other device 391 to transmit data to the device and then receives, in response to the trigger frame, at least one data frame from the first other device 390 and/or the second other device 391.

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 4A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 4C shows example 403 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 4D is a diagram illustrating another example 404 of OFDM and/or OFDMA. In this example 404, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 4E is a diagram illustrating an example 405 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processor and the communication interface (or alternatively a processor, such a processor 330a shown in FIG. 3A) configured to process received OFDM or OFDMA symbols and/or frames (and/or SC symbols and/or frames) and to generate such OFDM or OFDMA symbols and/or frames (and/or SC symbols and/or frames).

With respect to various arrangements of sub-carriers (e.g., with respect to descriptions of FIG. 4A-4D), note that different channels, sub-channels, frequency band, frequency range, range, etc. may be composed of a group or set of sub-carriers and various subsets thereof.

In certain of the diagrams, when uplink (UL) and/or downlink (DL) communications are indicated therein, note that downlink (DL) transmissions are marked as DL, and uplink (UL) transmission are marked as UL. Also, note that certain diagrams show a vertical axis that corresponds to sub-carrier (SCs), channel(s) (CHs), frequency (freq.), bandwidth, etc. and a horizontal axis that corresponds to time.

FIG. 5A is a diagram illustrating an example 501 of a poll window. In an example of operation, a device generates and transmits a resource and association poll frame (ra-poll frame) to a STA 1, STA 2, and STA 3 (e.g., other devices) in a DL transmission. The device transmits the ra-poll frame via a group or set of sub-carriers (e.g., the entire channel). The ra-poll frame specifies the STA 1, STA 2, and STA 3 as being authorized devices that have permission to transmit to the device. The ra-poll frame also specifies sub-carriers, sub-channels, etc. on which each of the STA 1, STA 2, and STA 3 are authorized to transmit to the device. Considering one example, the ra-poll frame specifies the STA 3 is authorized to transmit to the device via a first sub-channel, first set of sub-carriers, etc. and that STA 1 and STA 2 are authorized to transmit to the device via a second sub-channel, second set of sub-carriers, etc. The STA 3 then transmits a AR and a RR to the device via the first sub-channel, first set of sub-carriers, etc. The STA 1 and STA 2 then transmit respective RRs via the second sub-channel, first set of sub-carriers, etc. The device then generates a response frame (e.g., an acknowledgement (ACK) frame that includes an ACK, a block acknowledgement (BACK) frame that includes more than one ACK, and/or other type of response frame) that indicates successful receipt of the RRs and/or ARs from the STA 1, STA 2, and/or STA 3. The device then transmits the response frame to the STA 1, STA 2, and/or STA 3 (e.g., shown as to STA 1 and STA 3 in the diagram).

Note that certain examples described herein make reference to wireless station(s) (STA(s)), however, note that such reference(s) may generally be viewed as being any device (e.g., wireless communication device, STA, access point (AP), AP-operative STA, etc.).

In general, the UL transmission of a polled STA can occur within a specific sub-portion of the full operating channel of the system, e.g., within a subset of sub-carriers, a sub-channel, frequency sub-range, etc. where signals on distinct sub-channels are differentiated from signals on other sub-channels by frequency or by spatial signature or by a specific training sequence or by time separation or by spreading codes or by any combination of these.

In the ra-poll frame, the polling STA specifies which STAs may respond in each sub-channel. For example, multiple STAs may be assigned to a sub-channel. A single STA may be assigned to multiple sub-channels or to no sub-channels. All STAs may be permitted to transmit on some or all sub-channels.

In some examples, the polling STA may operate, in a preferred mode. Some examples of a preferred mode may be related to or implemented by operating to: limit contention among the transmissions of the resource requests, limit the number of requests that the polling STA must process, to exploit frequency diversity by 1) assigning STAs to specific sub-channels or 2) allowing STAs to choose a transmission sub-channel based on, for example, the channel with the highest SNR of the ra-poll frame at the STA, and/or to allow only resource requests or only association requests or a mix of both.

The polling STA may limit responses to polling by restricting resource or association requests to STAs in any of a number of ways. Some examples may be made with respect to restrictions with certain types of traffic or AC (Access Category) (e.g., best effort, voice, video, background), with a specified amount of traffic per AC, with a specific minimum received signal strength indicator (RSSI) measured during the receipt of ra-poll frame, of a specific identified device type (e.g. sensor, a smart meter station (SMSTA), etc.), with a specific media access control (MAC) address or with a MAC address that matches an entry from a list of MAC addresses (or from a list of truncated or mapped addresses, such as AIDs, the list may be in the form of a bitmap), and/or of devices that are part of a candidate set of STAs to form an MU-group, as identified by the polling STA.

In some examples, note also that any restriction on which STAs may respond may also restrict that identified set of STAs to respond on a specific subset of sub-channels.

For example, certain sub-channels (sub-CHs) may be assigned to respective STAs having respective association IDs (AIDs). Consider an example as follows: Sub-CH 1: AIDs 1, 2 5, 10, Sub-CH 2: AIDS 11, Sub-CH 3: STAs with at least a certain amount of date (e.g., 2 kilo-bytes) of data. STAs whose communications meet a certain power, RSSI, etc. level (e.g., RSSI>−40 dBm) can respond on any sub-channel, and any of the STAs can respond on the sub-channel with highest RSSI.

The ra-poll frame may specify whether STAs that are assigned a sub-channel and have data (e.g. resource requests or association requests) must respond or whether they should respond randomly, e.g. in order to limit the number of STA responses. Randomization parameters may be included in the polling frame or may be delivered to the polled STAs before the transmission of the polling frame. Randomization parameters may be specific to the type and/or amount of data that the polled STA has for transmission.

A polling STA may identify the following characteristics of the Resource/Association Request frame (e.g., ra-poll frame). Some examples of such characteristics may include any combination of the following: (1) Format, e.g., UL OFDMA frame, Single user (SU) frame, multi-user multiple-input-multiple-output (MU-MIMO) frame, high throughput (HT) format, very high throughput (VHT) format, extended rate PHY (ERP) format, (2) Bandwidth, (3) Sub-channel size, (4) Maximum number of symbols in the frame, (5) modulation coding set (MCS) of the frame, e.g. minimum, or one specific value, (6) number of spatial streams (NSS) of the frame, and/or (7) transmit power to be used for the transmission of the frame (e.g., potentially a function of the received power of the ra-poll frame).

Note also that, with respect to identification of the a desired receiver (RX) power of the resource request frame at the polling wireless communication device (e.g., polling STA), the resource request frame transmitter (TX) device can estimate the RX power at the polling wireless communication device (e.g., polling STA) using a variety of means including a measurement of the RX power of the poll frame, knowledge of the TX power of the polling wireless communication device (e.g., polling STA) from a previous exchange of that information, knowledge of its own TX power, and/or other consideration(s). Note also that an ra-poll frame may include any one or more types of information (e.g., TX Power of the ra-poll frame). Also, the poll response period may be designated to start shortly after ra-poll frame (e.g. short interframe space (SIFS) after ra-poll frame).

Note also that multiple STAs may send resource requests (RRs)/association requests (ARs) simultaneously on a channel. Sometimes, one or more packets may be lost during transmission. In the example in FIG. 5A, STA 1's resource request transmission is successful and STA 2's is not while STA 3's association and resource requests are successful.

The polling STA logs successful requests and may send an acknowledgement to those STAs whose RRs/ARs were successful. This may be achieved in any of a number of ways. For example, an acknowledgement may tell the STA to wait to receive a trigger frame before sending data. In the example of FIG. 5A, STAs 1 and 3 can expect trigger frames while STA 2 should not. The ra-poll ACK can have extra information such as expected trigger timing (e.g. so STA can sleep). Poll windows may appear periodically according to a schedule announced by the polling STA. If desired, STAs may sleep and awake for the next poll window if they have data. Note also that poll windows or time periods may appear at ad hoc times following an explicit announcement from a device (e.g., from an AP, a STA, etc.). Note also that an ra-poll frame may be appended to a beacon frame (e.g., such as transmitted from an AP).

FIG. 5B is a diagram illustrating another example 502 of a poll window. A poll window may be divided into different respective timeslots. STAs can be directed to transmit their resource/association requests in specific slots, or to randomly choose slots, or to randomly choose from a range of slots. Instructions regarding slot behavior may be included in the ra-poll frame. Instructions regarding slot behavior may be communicated to the STAs at other times (e.g. in beacons, association response frames, and/or management action frames). The polling STA may choose to transmit slot instruction information only when the information changes (e.g. to reduce overhead).

The ra-poll frame MAC contents may include various types of information. For example, an ra-poll frame may be identified uniquely within a MAC header of a transmission. For example, this may operate by using an alternate IEEE 802.11 MAC protocol version (e.g., other than b00, e.g. b01). Other fields (e.g., type, subtype, etc.), specifically identify the ra-poll frame in contrast or comparison to other frames that also use the alternate MAC protocol version. For another example, this may operate by using IEEE 802.11 MAC protocol version value b00, but by using currently reserved Type/Subtype bits combination.

FIG. 5C is a diagram illustrating an example of an ra-poll frame 503 that specifies which devices may respond and in what manner. In this ra-poll frame PHY structure (Option 1), an ra-poll frame information is contained in PHY payload symbols of ra-poll frame as shown in FIG. 5C. Such an ra-poll frame includes previously described parameters for the resource/association request transmissions. Such an ra-poll frame includes description of STAs allowed per sub-channel and limitations/conditions on whether they should respond and on which sub-channel(s), as described previously.

In this example and others herein, the preamble is composed of short training field (STF), long training field (LTF), and signal field (SIG). The data, ra-poll frame information, is composed of at least one data field. Among other purposes, STFs and LTFs can be used to assist a device to identify that a frame is about to start, to synchronize timers, to select an antenna configuration, to set receiver gain, to set up certain the modulation parameters for the remainder of the packet, to perform channel estimation for uses such as beamforming, etc. Among other purposes, the SIGs can include various information to describe the OFDM packet including certain attributes as data rate, packet length, number of symbols within the packet, channel width, modulation encoding, modulation coding set (MCS), modulation type, whether the packet as a single or multiuser frame, frame length, etc. among other possible information.

FIG. 5D is a diagram illustrating another example 504 of an ra-poll frame. There are two sets of ra-poll frame information as shown in FIG. 5D. In this ra-poll frame PHY structure (Option 2), the first set of ra-poll frame information is transmitted over the entire channel and may include information that is common for all polled STAs. The second set of ra-poll frame information may be transmitted on specific sub-channels and may include information that is specific to a subset of polled STAs. Common information may be sent in one or both of either the PHY header symbols and/or PHY payload symbols.

Resource request MAC contents of a frame may include any of the following: (1) transmitter (TX) address of request, receiver (RX) address of request, destination address (DA) of data for uplink (e.g., addresses may be full 48-bit addresses or may be shorter, mapped addresses, e.g., AID values, or a bitmap), (2) Priority of data for uplink, size/amount of data queued for uplink, duration of data for uplink, (3) Desired sub-channel for uplink, desired sub-channel width for uplink, (4) Expected/desired MCS for uplink data, desired data rate for uplink (e.g., Mbps), last uplink transmission time, (5) A parameter WIN, such that the resource request can specify a value of WIN, and a past data rate over the previous WIN seconds, and/or (6) TX power used for the resource request frame transmission. A polling STA may not guarantee that the resources granted will match the resource request.

(Re)association request MAC contents of a frame may include a (RE)association request that is transmitted in response to a ra-poll frame contains. This includes everything that a normal (re)association request frame contains, where "normal" means a (re)association request frame that is not transmitted as a response to a ra-poll frame.

The (Re)association request that is transmitted in response to a ra-poll frame may contain, in addition to the contents of a normal (re)association request frame, bit field(s) that include the same information that is found in a resource request frame.

Resource/association request PHY structure may include a format of the resource/association request frame is as described in the ra-poll frame that elicits it. Resource/association request takes the form of an MU UL data frame. Note that an MU UL frame can have a single user, device, STA, etc. Polling STA detects collisions via CRC. The STAs could employ power control based on their RSSI so that they are less likely to be drowned out by interference from an overlapping user e.g., for multi-user multiple-input-multiple-output (MU-MIMO).

Ra-poll response (e.g., acknowledgement (ACK)) contents may include an ra-poll ACK frame tells STA(s) that their resource/association request was received. An ra-poll ACK may indicate when to expect a trigger and which sub-channel to use when STA transmits an UL frame in response to the trigger. Such an ra-poll response frame may contain any one of more of the following: (1) List of STAs whose resource/association requests are being acknowledged, (2) List of STAs that are permitted to respond to the next trigger and/or the schedule assigning STAs to the next n MU UL frames, (3) STAs in a list may be identified by a 48-bit MAC address or a shorter, mapped identifier. For example, a shorter, mapped identifier may be implemented using any one of the following: AID values or an even shorter identifier, or by a position in a bitmap, a shorter identifier may be a subset of AID (e.g. with a portion of the AID (e.g. upper bits) in a common location), using a bitmap, or using some other hashing technique.

FIG. 6A is a diagram illustrating an example 601 of an ra-poll acknowledgement (ACK) frame. FIG. 6B is a diagram illustrating another example 602 of an ra-poll ACK frame. FIG. 6A and FIG. 6B show different examples of ra-poll ACK structures containing the information for all addressed STAs. In some examples, the wireless communication device can operate to send data across the entire channel, bandwidth, frequency, set or group of sub-carriers, or send the data for a particular sub-channel on that particular sub-channel only.

FIG. 6C is a diagram illustrating an example 603 of a trigger period. In this example, a trigger frame may be broadcast or multicast or may be OFDMA-like POLL frame. A trigger frame may contain address information and/or sub-channel assignment(s). For example, upon receiving a trigger containing its address a STA knows which sub-channel to use in the subsequent UL frame transmission. The trigger frame may indicate the start and stop time of the subsequent UL transmission. Polled STAs can piggyback a "More Data" request onto a data packet as shown in the first data frame in FIG. 8, plus the size and/or duration and/or MCS of additional pending data, or other parameters of the pending data (e.g. parameters such as are found in a resource request frame). This can be achieved either as additional fields within the MAC header or as separate MAC (media access control) data protocol unit(s) (MPDU(s)).

Note that Polling STA can piggyback triggers onto the ACK packets as shown in FIG. 6C. Either as additional fields within the PHY or MAC headers or as separate MPDU(s). Polling STA can choose to end the trigger period by sending an ACK with no trigger.

If a more data indicator was present in the transmission, then the polling STA may acknowledge the data and the resource request together (FIG. 6C) or separately. The resource request ACK may include information on which sub-channel the STA should use and when to expect a trigger.

In some examples, a poll period may be used to determine which STAs have data. This can provide for better management of power consumption at STA. STAs wake at a known time for the poll window and remain awake as needed through the trigger period which immediately follows, thereby allowing a reduced number of wake events. In some modes of operation, the STA does not wake and wait for other STAs to randomly wake in order to gather a critical mass of requests for an MU UL session. This can provide for polling STA to control its scheduling load. This can also provide for polling STA to control latency. This can also provide for polling STA to control allocation of bandwidth to STAs to satisfy Quality of Service (QoS) and other requirements. This can provide for polling STA to coordinate with other polling STAs.

A trigger period can be used to provide for better management of power consumption at a STA. Also, the novel solutions presented herein can make use of entire available transmission bandwidth (BW) (e.g., such that some transmissions operate based on the entire bandwidth, frequency, channel, sub-carriers, etc. while other transmissions operate using subset(s) of the entire bandwidth, frequency, channel, sub-carriers, etc.).

A poll period can provide for determination of which STAs would like to associate that can handle multiple associate and resource requests. This can enable STAs to be detected or heard on a narrow band (e.g., subset of bandwidth, frequency, channel, sub-carriers, etc.) when they would not be heard on the full band and also improve spectral efficiency.

Figure 7A:
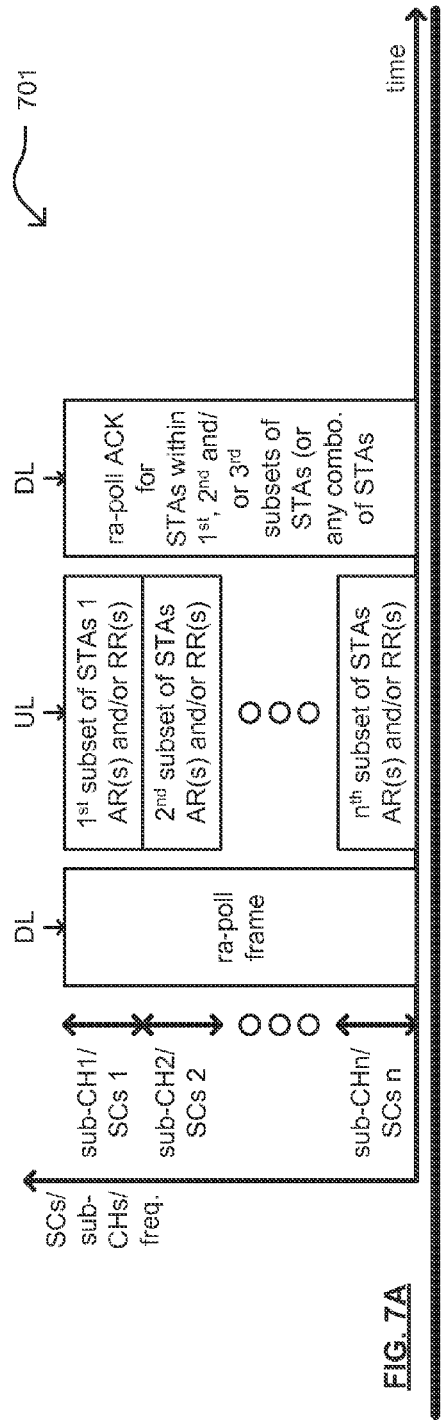
FIG. 7A is a diagram illustrating another example of a poll window.

FIG. 7A is a diagram illustrating another example 701 of a poll window. A device generates and transmits an ra-poll frame using the entire available transmission bandwidth, all sub-channels, all sub-carriers, etc. in a DL transmission. The device then receives first RR(s) and/or AR(s) from a subset of STAs 1 (e.g., first subset of STAs) via a first sub-channel, first subset of sub-carriers, etc., second RR(s) and/or AR(s) from a subset of STAs 2 (e.g., second subset of STAs) via a second sub-channel, second subset of sub-carriers, etc., and up to nth RR(s) and/or AR(s) from a subset of STAs n (e.g., nth subset of STAs) via nth sub-channel, nth subset of sub-carriers, etc. using the entire available transmission bandwidth, all sub-channels, all sub-carriers, etc. in an UL transmission. The device then generates and transmits a response such as a ra-poll frame ACK frame for and to the STAs within the first, second, and/or third subsets of STAs using the entire available transmission bandwidth, all sub-channels, all sub-carriers, etc. in another DL transmission.

Figure 7B:
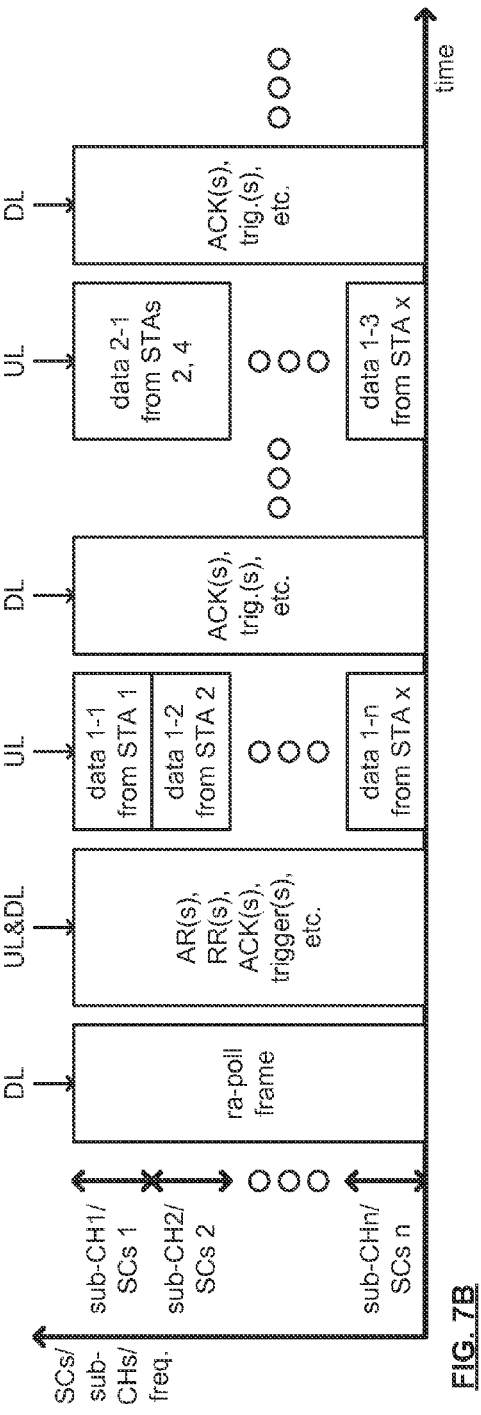
FIG. 7B is a diagram illustrating another example of a poll window.

FIG. 7B is a diagram illustrating another example 702 of a poll window. A device generates and transmits to device(s) an ra-poll frame using the entire available transmission bandwidth, all sub-channels, all sub-carriers, etc. in a DL transmission, and conducts one or more frame exchanges with at least one of the device(s) for one or more of AR(s), RR(s), ACK(s), and/or trigger(s), etc. (e.g., based on any desired combination of sub-channels, sub-carriers, etc.). The device then receives data 1-1 from STA 1 via a first sub-channel, first subset of sub-carriers, etc., data 1-2 from STA 2 via a second sub-channel, second subset of sub-carriers, etc., and up to data 1-$n$ from STA x via nth second sub-channel, nth subset of sub-carriers, etc. via an UL transmission. The device then transmits ACK(s) and/or trigger(s), etc. in a DL transmission. In some examples, additional UL transmissions of data from the various STAs (e.g., based on any desired combination of sub-channels, sub-carriers, etc.) and additional DL transmissions ACK(s) and/or trigger(s), etc. may be made between the device and the STAs.

Note that the structure of an ra-poll frame may be of any of a variety of types. For example, certain information may be split among different field of the ra-poll frame so that all recipient devices can receive and process them. For example, certain bits within an ra-poll frame that indicate authorization and sub-carrier subset(s) may be split among different field of the ra-poll frame so that so that all recipient devices can receive and process them.

FIG. 8A is a diagram illustrating an embodiment of a method 801 for execution by one or more wireless communication devices. The method 801 begins by generating a resource and association poll frame (ra-poll frame) (block 810). In some examples, the ra-poll frame specifies parameters for use by other wireless communication devices to determine eligibility of the other wireless communication devices to transmit to the wireless communication device. In some other examples, the ra-poll frame also specifies one or more subsets of sub-carriers, timeslots, and/or frame format(s) for use by the other wireless communication devices to transmit to the wireless communication device.

The method 801 continues by transmitting (e.g., via a communication interface of the wireless communication device) the ra-poll frame to the other wireless communication devices via the plurality of sub-carriers (block 820). The method 801 continues by determining (decision block 830) whether at least one of the other wireless communication devices is eligible to transmit to the wireless communication device based on the parameters. In some examples, this operation may be performed on a per other wireless communication device such that each of the other wireless communication devices determines whether or not it is eligible to transmit to the wireless communication device based on the parameters. If no other wireless communication device is eligible, the method 801 ends or alternatively generates and transmits another ra-poll frame to the other wireless communication devices.

When at least one other wireless communication device is determined to be eligible (decision block 830), the method 801 continues by receiving (e.g., via the communication interface of the wireless communication device) an association request and/or a resource request that complies with the at least one authorized frame format from the at least one wireless communication device that is eligible (block 840). The method 801 continues by generates at least one response frame that indicates successful receipt of the association request and/or the resource request. The method 801 then operates by transmitting (e.g., via the communication interface of the wireless communication device and via the plurality of sub-carriers, via the plurality of sub-carriers), the at least one response frame to the at least one wireless communication device.

FIG. 8B is a diagram illustrating another embodiment of a method 802 for execution by one or more wireless communication devices. The method 802 begins by generating and transmitting a ra-poll frame to device (block 811). The method 802 continues by receiving first AR(s) and/or RR(s) from a first subset of devices (e.g., a first at least one authorized device) (block 821). The method 802 then operates by receiving second AR(s) and/or RR(s) from a second subset of devices (e.g., a second at least one authorized device) (block 831). The method 802 continues by generating and transmitting ACK(s) (that may include trigger(s)) to the devices that indicate successful receipt of at least one of the first AR(s) and/or RR(s) and/or second AR(s) and/or RR(s) (block 841).

FIG. 9A is a diagram illustrating another embodiment of a method 901 for execution by one or more wireless communication devices. The method 901 begins by generating & transmitting trigger frame(s) (may be combined with ACK(s)) to prompt selected wireless communication device(s) to transmit data (block 910). The method 901 continues by receiving data from the selected wireless communication device(s) based on the trigger frame(s) (block 920).

FIG. 9B is a diagram illustrating another embodiment of a method 902 for execution by one or more wireless communication devices. The method 902 begins by generating ra-poll frame & transmitting (e.g., via sub-carriers) the ra-poll frame to wireless communication devices (block 911). The method 902 continues by receiving (e.g., via $1^{st}$ subset of the sub-carriers) $1^{st}$ AR(s) and/or RR(s) from first subset of the wireless communication devices and simultaneously receiving (e.g., via $2^{nd}$ subset of the sub-carriers) $2^{nd}$ AR(s) and/or RR(s) from $2^{nd}$ subset of the wireless communication devices ($1^{st}$ AR(s) and/or RR(s) and $2^{nd}$ AR(s) and/or RR(s)) (block 921).

FIG. 9C is a diagram illustrating another embodiment of a method 903 for execution by one or more wireless communication devices. The method 902 begins by generating & transmitting announcement frame(s) to specify ra-poll frame(s) (block 912). In one mode or example of operation, the method 902 continues by generating & transmitting ra-poll frame(s) at ad hoc times following the announcement frame(s) (block 922). In another mode or example of operation, the method 902 then operates by generating & transmitting ra-poll frame(s) based on scheduled included within the announcement frame(s) (block 932). In some instances, the method 902 continues such that certain STA(s) sleep and awake for next poll window if have data for UL TX (block 942).

FIG. 9D is a diagram illustrating another embodiment of a method 904 for execution by one or more wireless communication devices. The method 902 begins by generating & transmitting beacon frame(s) that include ra-poll frame(s) (e.g., appended thereto) (block 913). The method 902 continues by receiving association request(s) (AR(s)) and/or resource request(s) (RR(s)) (from authorized WDEV(s)) (block 923). The method 902 then operates by generating & transmitting ACK(s) (ACK(s) may include trigger(s)) that indicate successful receipt of at least one of the AR(s) and/or RR(s) (block 933).

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a processor configured to:
  generate a resource and association poll frame (ra-poll frame) that specifies a plurality of parameters to be used by a plurality of other wireless communication devices to determine eligibility of the plurality of other wireless communication devices to transmit to the wireless communication device, and wherein the ra-poll frame also specifies at least one of a plurality of subsets of sub-carriers of a plurality of sub-carriers, a plurality timeslots, or at least one authorized frame format to be used by the plurality of other wireless communication devices to transmit to the wireless communication device;
  transmit, via the plurality of sub-carriers, the ra-poll frame to the plurality of other wireless communication devices; and
  when at least one wireless communication device of the plurality of other wireless communication devices determines eligibility to transmit to the wireless communication device based on the plurality of parameters:
    receive at least one of an association request or a resource request that complies with the at least one authorized frame format from the at least one wireless communication device;
    generate a response frame that indicates successful receipt of the at least one of the association request or the resource request; and
    transmit, via the plurality of sub-carriers, the response frame to the at least one wireless communication device.

2. The wireless communication device of claim 1, wherein the processor is further configured to:
generate and transmit another ra-poll frame to the plurality of other wireless communication devices when no association request and no resource request is received after a period of time after transmission of the ra-poll frame to the plurality of other wireless communication devices, wherein the another ra-poll frame includes another plurality of parameters for use by the plurality of other wireless communication devices to determine eligibility of the plurality of other wireless communication devices to transmit to the wireless communication device.

3. The wireless communication device of claim 1, wherein the processor is further configured to:
generate another ra-poll frame that specifies a subset of authorized wireless communication devices of the plurality of other wireless communication devices that are authorized to transmit to the wireless communication device and at least one of another plurality of subsets of sub-carriers of the plurality of sub-carriers for use by the subset of authorized wireless communication devices to transmit to the wireless communication device or at least one other authorized frame format for use by the subset of authorized wireless communication devices to transmit to the wireless communication device;
transmit, via the plurality of sub-carriers, the another ra-poll frame to the plurality of other wireless communication devices;
receive, via the at least one subset of sub-carriers and from at least one other wireless communication device of the subset of authorized wireless communication devices, at least one of another association request or another resource request that complies with the at least one other authorized frame format;
generate another response frame that indicates successful receipt of the at least one of the another association request or the another resource request; and
transmit, via the plurality of sub-carriers, the another response frame to the at least one other wireless communication device.

4. The wireless communication device of claim 1, wherein the processor is further configured, when the at least one wireless communication device of the plurality of other wireless communication devices determines eligibility to transmit to the wireless communication device based on the plurality of parameters, to:
receive at least one resource request that complies with the at least one authorized frame format from the at least one wireless communication device;
process the at least one resource request to identify at least one type of resource requested by the at least one wireless communication device;
generate a grant frame that includes at least one grant of the at least one type of resource to the at least one wireless communication device;
transmit the grant frame to the at least one wireless communication device; and
receive at least one data frame from the at least one wireless communication device, wherein the at least one data frame is based on the at least one grant of the at least one type of resource.

5. The wireless communication device of claim 1, wherein the processor is further configured to:
generate and transmit another ra-poll frame that specifies a first authorized wireless communication device and a second authorized wireless communication device of the plurality of other wireless communication devices that are authorized to transmit to the wireless communication device, a first subset of sub-carriers of the plurality of sub-carriers for use by the first authorized wireless communication device to transmit to the wireless communication device, and a second subset of sub-carriers of the plurality of sub-carriers for use by the second authorized wireless communication device to transmit to the wireless communication device; and
receive an orthogonal frequency division multiple access (OFDMA) communication that includes at least one of a first association request or a first resource request via the first subset of sub-carriers and from the first authorized wireless communication device and that also includes at least one of a second association request or a second resource request via the second subset of sub-carriers and from the second authorized wireless communication device, wherein the at least one of the first association request or the first resource request and the at least one of the second association request or the second resource request have a communication length or duration.

6. The wireless communication device of claim 1, wherein the processor is further configured to:
generate the ra-poll frame that also specifies at least one authorized traffic type of a plurality of traffic types; and
receive the at least one of the association request or the resource request from the at least one wireless communication device when the at least one wireless communication device includes at least some traffic of the at least one authorized traffic type.

7. The wireless communication device of claim 1, wherein, when the at least one wireless communication device of the plurality of other wireless communication devices determines eligibility to transmit to the wireless communication device based on the plurality of parameters, the processor is further configured to:
receive the at least one of the association request or the resource request that complies with the at least one authorized frame format from the at least one wireless communication device;
generate the response frame that includes trigger information that prompts at least one of a first other wireless communication device or a second other wireless communication device of the plurality of wireless communication devices to transmit data to the wireless communication device;
transmit, via the plurality of sub-carriers, the response frame to the at least one wireless communication device; and
receive, in response to response frame, at least one data frame from the at least one of the first other wireless communication device or the second other wireless communication device.

8. The wireless communication device of claim 1 further comprising:
an access point (AP), wherein the plurality of other wireless communication devices includes a wireless station (STA).

9. A wireless communication device comprising:
a processor configured to:
generate a resource and association poll frame (ra-poll frame) that specifies a plurality of parameters to be used by a plurality of other wireless communication devices to determine eligibility of the plurality of other wireless communication devices to transmit to the wireless communication device, and wherein the ra-poll frame also specifies a plurality of subsets of sub-carriers of a plurality of sub-carriers for use by the plurality of other wireless communication devices to transmit to the wireless communication device to be used by the plurality of other wireless communication devices to transmit to the wireless communication device;

transmit, via the plurality of sub-carriers, the ra-poll frame to the plurality of other wireless communication devices; and when only a first other wireless communication device of the plurality of other wireless communication devices determines eligibility to transmit to the wireless communication device:

receive at least one of a first association request or a first resource request from the first other wireless communication device based on the plurality of parameters;

generate a first response frame that indicates successful receipt of the at least one of the first association request or the first resource request; and transmit, via the plurality of sub-carriers, the first response frame to the first other wireless communication device; and when the first other wireless communication device and a second other wireless communication device of the plurality of other wireless communication devices determine eligibility to transmit to the wireless communication device based on the plurality of parameters:

receive an orthogonal frequency division multiple access (OFDMA) communication that includes at least one of the first association request or the first resource request via a first subset of sub-carriers and from the first other wireless communication device and that also includes at least one of a second association request or a second resource request via a second subset of sub-carriers and from the second wireless communication device.

10. The wireless communication device of claim 9, wherein the at least one of the first association request or the first resource request and the at least one of the second association request or the second resource request have a communication length or duration.

11. The wireless communication device of claim 9, wherein the processor is further configured to:

generate and transmit another ra-poll frame to the plurality of other wireless communication devices when no association request and no resource request is received after a period of time after transmission of the ra-poll frame to the plurality of other wireless communication devices, wherein the another ra-poll frame includes another plurality of parameters for use by the plurality of other wireless communication devices to determine eligibility of the plurality of other wireless communication devices to transmit to the wireless communication device.

12. The wireless communication device of claim 9, wherein the processor is further configured to:

generate the ra-poll frame that also specifies at least one authorized traffic type of a plurality of traffic types; and receive another communication from at least one of the first other wireless communication device or the second wireless communication device when the at least one of the first other wireless communication device or the second wireless communication device includes at least some traffic of the at least one authorized traffic type.

13. The wireless communication device of claim 9 further comprising:

an access point (AP), wherein the plurality of other wireless communication devices includes a wireless station (STA).

14. A method for execution by a wireless communication device, the method comprising:

generating a resource and association poll frame (ra-poll frame) that specifies a plurality of parameters to be used by a plurality of other wireless communication devices to determine eligibility of the plurality of other wireless communication devices to transmit to the wireless communication device, and wherein the ra-poll frame also specifies at least one of a plurality of subsets of sub-carriers of a plurality of sub-carriers, a plurality timeslots, or at least one authorized frame format to be used by the plurality of other wireless communication devices to transmit to the wireless communication device;

transmitting, via a communication interface of the wireless communication device and via the plurality of sub-carriers, the ra-poll frame to the plurality of other wireless communication devices; and when at least one wireless communication device of the plurality of other wireless communication devices determines eligibility to transmit to the wireless communication device based on the plurality of parameters:

receiving, via the communication interface of the wireless communication device, at least one of an association request or a resource request that complies with the at least one authorized frame format from the at least one wireless communication device;

generate a response frame that indicates successful receipt of the at least one of the association request or the resource request; and transmitting, via the communication interface of the wireless communication device and via the plurality of sub-carriers, via the plurality of sub-carriers, the response frame to the at least one wireless communication device.

15. The method of claim 14 further comprising:

generating and transmitting another ra-poll frame to the plurality of other wireless communication devices when no association request and no resource request is received after a period of time after transmission of the ra-poll frame to the plurality of other wireless communication devices, wherein the another ra-poll frame includes another plurality of parameters for use by the plurality of other wireless communication devices to determine eligibility of the plurality of other wireless communication devices to transmit to the wireless communication device.

16. The method of claim 14 further comprising:

generating another ra-poll frame that specifies a subset of authorized wireless communication devices of the plurality of other wireless communication devices that are authorized to transmit to the wireless communication device and at least one of another plurality of subsets of sub-carriers of the plurality of sub-carriers for use by the subset of authorized wireless communication devices to transmit to the wireless communication device or at least one other authorized frame format for use by the subset of authorized wireless communication devices to transmit to the wireless communication device;

transmitting, via the plurality of sub-carriers, the another ra-poll frame to the plurality of other wireless communication devices;

receive, via the the at least one subset of sub-carriers and from at least one other wireless communication device of the subset of authorized wireless communication devices, at least one of another association request or another resource request that complies with the at least one other authorized frame format;

generating another response frame that indicates successful receipt of the at least one of the another association request or the another resource request; and transmitting, via the plurality of sub-carriers, the another response frame to the at least one other wireless communication device.

17. The method of claim 14, wherein when the at least one wireless communication device of the plurality of other wireless communication devices determines eligibility to transmit to the wireless communication device based on the plurality of parameters, further comprising:

receiving at least one resource request that complies with the at least one authorized frame format from the at least one wireless communication device;

processing the at least one resource request to identify at least one type of resource requested by the at least one wireless communication device;

generating a grant frame that includes at least one grant of the at least one type of resource to the at least one wireless communication device;

transmitting the grant frame to the at least one wireless communication device; and receiving at least one data frame from the at least one wireless communication device, wherein the at least one data frame is based on the at least one grant of the at least one type of resource.

18. The method of claim 14 further comprising:

generating and transmitting another ra-poll frame that specifies a first authorized wireless communication device and a second authorized wireless communication device of the plurality of other wireless communication devices that are authorized to transmit to the wireless communication device, a first subset of sub-carriers of the plurality of sub-carriers for use by the first authorized wireless communication device to transmit to the wireless communication device, and a second subset of sub-carriers of the plurality of sub-carriers for use by the second authorized wireless communication device to transmit to the wireless communication device; and receiving an orthogonal frequency division multiple access (OFDMA) communication that includes at least one of a first association request or a first resource request via the first subset of sub-carriers and from the first authorized wireless communication device and that also includes at least one of a second association request or a second resource request via the second subset of sub-carriers and from the second authorized wireless communication device, wherein the at least one of the first association request or the first resource request and the at least one of the second association request or the second resource request have a communication length or duration.

19. The method of claim 14 further comprising:

generating the ra-poll frame that also specifies at least one authorized traffic type of a plurality of traffic types; and receiving the at least one of the association request or the resource request from the at least one wireless communication device when the at least one wireless communication device includes at least some traffic of the at least one authorized traffic type.

20. The method of claim 14, wherein the wireless communication device is an access point (AP), and the plurality of other wireless communication devices includes a wireless station (STA).

* * * * *